(No Model.)

N. NILSON.
STEAM TRAP.

No. 483,119.　　　　　Patented Sept. 20, 1892.

Witnesses.
J. Jessen.
O. G. Hawley.

Inventor.
Nils Nilson.
By Paul A. Merwin att'ys

United States Patent Office.

NILS NILSON, OF MINNEAPOLIS, ASSIGNOR OF ONE-HALF TO EDWARD F. QUACKENBUSH, OF LE SUEUR, MINNESOTA.

STEAM-TRAP.

SPECIFICATION forming part of Letters Patent No. 483,119, dated September 20, 1892.

Application filed December 8, 1891. Serial No. 414,432. (No model.)

*To all whom it may concern:*

Be it known that I, NILS NILSON, of Minneapolis, in the county of Hennepin and State of Minnesota, have invented certain Improved Steam-Traps, of which the following is a full, clear, and exact specification.

My invention relates to improvements in steam-traps; and its object is especially to provide a simple, cheap, and reliable steam-trap for use upon railway-coaches in connection with the steam heating apparatus thereof, and, further, a trap without springs and entirely dependent for its action upon steam-pressure and weights and leverages.

To this end the invention consists in the combination, with the inclosing case or box, of a vertically-acting valve and valve-stem arranged therein and inclosed in a separate casing having a large opening at its top and several small holes in its lower wall, said stem provided with a separate disk to engage the shoulder of said casing, a counterbalance-weight arranged in connection with said stem and adapted to hold the valve open when the steam-pressure is cut off, and a float arranged in the trap or box and having an arm pivoted in said casing and adapted to engage the stem to open the valve when said float is raised by the accumulation of water in the bottom of the trap.

My invention will be more readily understood by reference to the accompanying drawings, in which—

Figure 1:
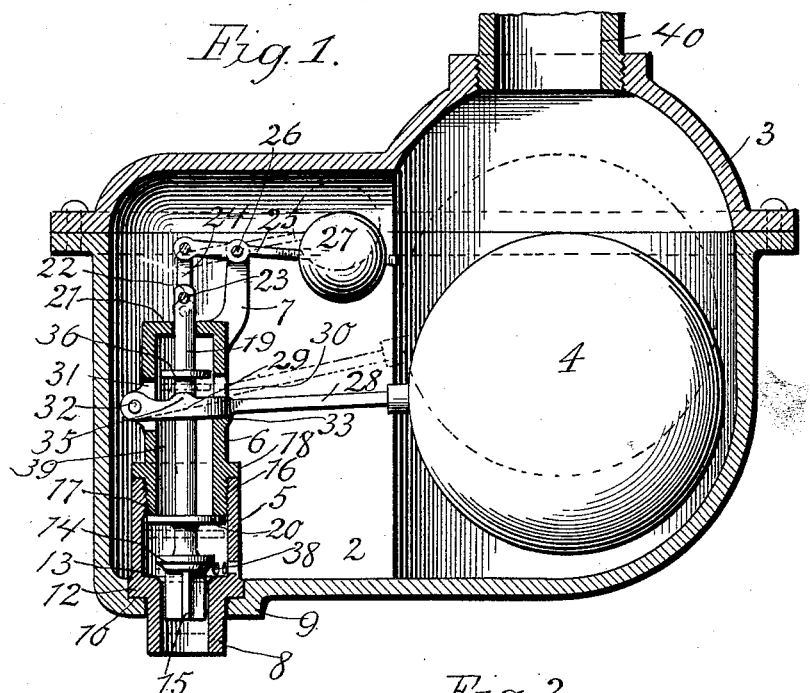
Figure 2:
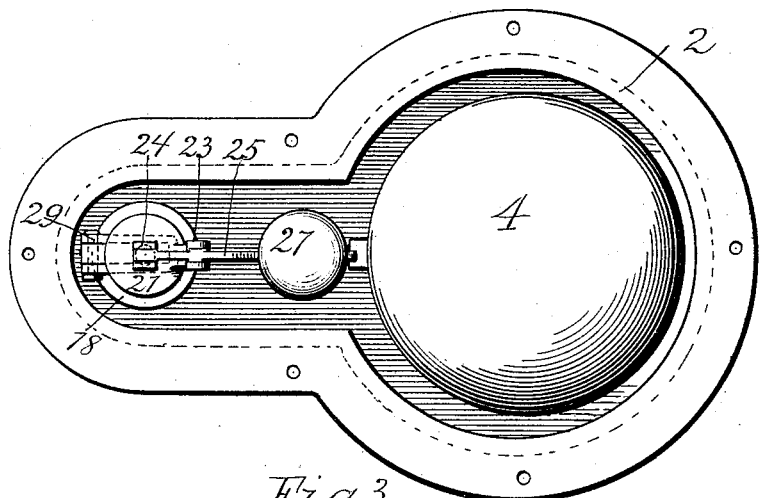
Figure 3:

Figure 1 is a vertical sectional view of one of my steam-traps. Fig. 2 is a plan view of the same with the cover removed. Fig. 3 is a detail.

As shown in the drawings, the main part 2 of the trap or box is cast in a single piece and is provided with the cover 3 of a similar shape and having the dome portion into which the float-ball 4 may rise. In the narrow portion of the box is located the valve, having the casing composed of the lower part 5 and the upper portion 6, which is provided with the arm 7. The lower portion has the nipple 8, which is secured in the boss 9, formed on the under side of the box-trap. The surface 10 on the inside of the boss is made true, so as to form a steam-tight joint with the shoulder 12 of the part 5. On the inside of this part is the valve-seat 13, upon which the valve-disk 14 is adapted to rest and concentric with which it is held by the ribs 15, extending from the lower side of the disk. The lower side of the casing is larger than the upper, which part is threaded at 16 and screwed into the same, the shoulder 17 being thereby made by the lower end of the part 6. The annular rib 18 upon the part 6 makes a steam-tight joint with the top of the lower walls 5. The valve-stem 19, whereon the disk is formed, is provided with the larger disk or collar 20, which when the valve is unseated engages the shoulder 17. The upper end of the stem passes through and is guided by the top 21 of the part 6 and is provided with the eye 22, through which the bolt 23 passes to secure the link 24. By this link the upper end of the stem is pivotally connected with the short arm of the lever 25, which is pivoted in the upper end of the drum 7 by the pin or bolt 26. The long end of this lever is threaded, as shown, and adapted to receive the adjustable weight-ball 27, which is heavier than the valve stem and disk, which are consequently held up in the position shown in Fig. 1 when the trap is empty of steam. The float 4 has the arm 28, having the forked end 29 extending through the slots 30 and 31 in the sides of the part 6 and pivoted in the latter by the pin 32. The lower side of the slot 30 forms the stop 33, whereon the rod or arm 28 normally rests when the trap is empty. The slot 30 is of such a height that the float and rod may rise to the position shown in dotted lines without interfering with the upper end thereof. The raised shoulder 35 on the fork 29 is adapted to engage the collar 36 when the rod is thus lifted, thereby raising the valve stem or spindle and unseating the valve, whereupon the weight 27 instantly acts to raise the valve to its full height. The collar 36, formed on the stem 19, is so arranged that when the valve is seated and the arm is in the lower position the collar will stand a short distance above the shoulder or shoulders 31, this slight space being left to allow considerable vertical vibration of the float caused by the jarring of the train. In the lower part the walls 5 are provided with one or more holes 38, the combined areas of which are considerably less than the area of the opening or chamber 39, within which is the part 6 or the area of the openings or slots 30 and 31.

This steam-trap is arranged at the lowest point of the steam-heating system and the condensation enters the trap through the pipe 40, extending through the top of the cover 3.

The action of the device is as follows: Suppose the steam to be turned on for the first time. The parts of the valve will have at that time been arranged in the full-line positions of Fig. 1. Now the steam fills the trap and flows out through the small opening 38 in the lower part of the valve-casing thereof. The area, however, of these openings being small and the area of the disk 20 large it will be seen that the steam entering through the slots in the part 6 will force down the disk, and therewith the valve upon its seat, after which the valve will be held thereon by the pressure of the steam upon its upper surface opposing the counterbalance-weight 27. In practice this action will take place with about five ounces of steam-pressure in the trap. After the seating of the valve the trap will be gradually filled with water, which rising therein will lift the float, thereby unseating the valve to allow the water to flow out through the nipple 8. The water being wholly or partly discharged in this way the valve will again be seated by pressure of steam above the same. It will thus be seen that I provide a steam-trap of a very strong and durable construction, which is very cheap to manufacture, and which is perfectly automatic in its action, it being impossible for water to be retained in the trap after the steam-pressure is shut off, as pressure being relieved from the top of the valve it will immediately be thrown open by the falling of the weight 27.

Having thus described my invention, I claim as new and desire to secure by Letters Patent—

1. The combination, with the box, of the valve-casing arranged therein and having an extension leading through the bottom of the box, a float arranged in said box, a stem arranged in said casing, said float provided with an arm to engage said stem, a weight arranged to raise said stem and valve, a shoulder provided in said casing, a disk 20, arranged on said stem to engage the same, a valve and seat, openings in the lower part of the casing, larger openings in the upper part thereof, and a condensation-pipe extending into said box, substantially as described.

2. The combination, in a steam-trap, of the trap-box or chamber with a valve arranged therein and consisting of a disk, a seat therefor, a spindle whereon said disk is arranged, guides therefor, a casing inclosing said valve, openings 38, arranged in the lower part thereof, a shoulder 17 therein, a disk arranged on said spindle and adapted to engage said shoulder, a weight arranged to automatically open said valve when the pressure is relieved, a float arranged in said box, an arm extending therefrom and pivoted back of said spindle, said arm adapted to engage a shoulder on said spindle when the arm is raised, openings arranged above the shoulder 17 and of a greater diameter than the combined area of the hole or holes provided in the lower part of the casing, and a condensation-pipe leading into said box, as and for the purpose specified.

3. The combination, with the steam-trap box, of the valve-casing arranged therein and provided with the internal shoulder 17, openings 38 in the lower part of said casing, an opening through the lower end of said casing and wherethrough the water or steam is discharged, a valve-disk arranged within said casing, the spindle thereof, a disk 20 thereon to engage the shoulder 17, the pivoted weight-lever provided with the weight 27 and connected with said spindle and normally tending to lift the same, a float 2, an arm 28 thereof pivoted back of said spindle, a shoulder or collar arranged on the spindle to be engaged by said arm when raised, openings in the upper part of the valve-casing greater in area than the openings in the lower part thereof, and a condensation-pipe connected with said box, all substantially as described.

4. The combination, with the closed box, of the condensation-pipe, through which condensed steam enters the same, a separate valve-casing arranged in said box and composed of the lower part 5, having the nipple 8, extending through the bottom of the box, and the upper part 6, extending into the lower part and provided with slots 30 and 31, the spindle 19, arranged in said case and having the valve-disk 14, a seat arranged in the lower part 5 to receive said disk, a disk 20, provided on the spindle to engage the lower end or shoulder of the part 6, the arm 7, arranged on the upper part of the lever 25, pivoted thereon, the link 24, pivotally connecting the same with the upper end of said spindle or stem, the adjustable weight on said lever, the float arranged in the box, the arm 28 thereof, having the forked end and pivoted back of the stem, raised shoulders thereon, and a collar on said stem to be engaged thereby to raise the stem when said arm and float are raised, and said lower part 5 being provided with a hole or holes 38 of smaller area than the openings in the upper part 6, as and for the purpose specified.

5. The combination, with the box having the cover 3 and the smaller portion, of the valve-casing arranged in said smaller portion and having a nipple leading through the bottom of the box, a float arranged in said box, a stem arranged in said casing, said float provided with an arm to engage said stem, a weight arranged to raise said stem, a shoulder provided in said casing, a disk 20, arranged on said stem to raise the same, a valve and seat, openings in the lower part of the casing, larger openings in the upper part thereof, and a condensation-pipe extending into said box, substantially as described.

In testimony whereof I have hereunto set my hand this 24th day of November, 1891.

NILS NILSON.

In presence of—
  C. G. HAWLEY,
  F. S. LYON.